(12) United States Patent
Nakata (10) Patent No.: US 7,071,989 B2
(45) Date of Patent: Jul. 4, 2006

(54) FLASH DEVICE, CAMERA APPARATUS HAVING THE FLASH DEVICE, METHOD OF CAUSING THE FLASH DEVICE TO EMIT COLORED RAYS OF LIGHT THEREFROM, AND RECORDING MEDIUM IN WHICH PROGRAM TO CONTROL THE FLASH DEVICE SO AS TO EMIT DESIRED COLORED RAYS OF LIGHT IS STORED

(75) Inventor: Hiroyuki Nakata, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 700 days.

(21) Appl. No.: 10/238,331

(22) Filed: Sep. 9, 2002

(65) Prior Publication Data

US 2003/0052992 A1    Mar. 20, 2003

(30) Foreign Application Priority Data

Sep. 14, 2001    (JP) ............................... 2001-279559

(51) Int. Cl.
*H04N 5/222*    (2006.01)

(52) U.S. Cl. .................................................... 348/371

(58) Field of Classification Search ..................... None
See application file for complete search history.

(56) References Cited

U.S. PATENT DOCUMENTS

| | | | | | |
|---|---|---|---|---|---|
| 5,010,412 | A | * | 4/1991 | Garriss ........................ | 348/371 |
| 5,748,236 | A | * | 5/1998 | Shibazaki .................... | 348/270 |
| 6,095,661 | A | * | 8/2000 | Lebens et al. .............. | 362/184 |
| 6,256,067 | B1 | * | 7/2001 | Yamada ....................... | 348/370 |
| 6,741,286 | B1 | * | 5/2004 | Meek et al. ................. | 348/370 |
| 2002/0191102 | A1 | * | 12/2002 | Yuyama et al. ............. | 348/370 |

FOREIGN PATENT DOCUMENTS

| | | |
|---|---|---|
| JP | 10-206942 A | 8/1998 |
| JP | 11-133490 A | 5/1999 |
| JP | 2000-235462 A | 8/2000 |
| JP | 2001-215579 A | 8/2001 |
| JP | 2002-116481 A | 4/2002 |

* cited by examiner

*Primary Examiner*—David Ometz
*Assistant Examiner*—Dillon Durnford-Geszvain
(74) *Attorney, Agent, or Firm*—Frishauf, Holtz, Goodman & Chick, P.C.

(57) ABSTRACT

A flash device is provided which causes a plurality of light emitting elements to emit desired white strobe light independent of possible uneven brightnesses of light being emitted by light emitting used. Red, green and blue light emitting elements are driven to emit corresponding colored rays of light to thereby provide white strobe light. Percentages of respective total light emission times of the light emitting elements are determined depending on the percentage data of light being emitted by those light emitting elements and stored in memory.

14 Claims, 9 Drawing Sheets

FLASH DEVICE, CAMERA APPARATUS HAVING THE FLASH DEVICE, METHOD OF CAUSING THE FLASH DEVICE TO EMIT COLORED RAYS OF LIGHT THEREFROM, AND RECORDING MEDIUM IN WHICH PROGRAM TO CONTROL THE FLASH DEVICE SO AS TO EMIT DESIRED COLORED RAYS OF LIGHT IS STORED

BACKGROUND OF THE INVENTION

The present invention relates to flash devices using light emitting elements including light emitting diodes.

In the past, there are conventional cameras and digital cameras that pick up an image of an object, using a CCD- or MOS-type solid-state image pickup device and record the image data on a recording medium such as a flash memory. In such cameras, a built-in or external strobe is used in order to compensate for an insufficient quantity of exposure light, for example, in image pickup. Generally, the strobe uses a xenon bulb as a light emitting element. The xenon bulb emits light when in response to a trigger signal it is supplied with power stored beforehand in a main capacitor. The charging of the main capacitor is performed immediately after the power supply or the strobe is turned on. However, it takes several seconds until the main capacitor is completely charged. Therefore, the image pickup is impossible during such charging time in the strobe using the xenon bulb. In addition, even a small main capacitor has a diameter of about 10-mm and a length of about 25–40 mm, so that miniaturization of the flash device is difficult.

Under such situation, it has been proposed that a light emitting diode (LED) should be used as a light emitting element to eliminate a need for the main capacitor and that a different kind of LED should be used to emit different-colored rays of light from the strobe. Generally, the light emitting diodes emit rays of light having uneven brightnesses and are ranked according to brightness. In use, light emitting diodes in an acceptable rank are used selectively.

SUMMARY OF THE INVENTION

Therefore, the present invention provides a flash device capable of providing strobe light including required colored rays of light, a camera apparatus including the flash device, a method of controlling the flash device to emit desired colored rays of light, and a recording medium that has stored a program that controls the flash device so as to emit the desired colored rays of light.

According to the present invention, there is provided a flash device comprising a plurality of light emitting elements each emitting a different colored ray of light; a storage device having stored percentage data representing total light emission times for the respective ones of the plurality of light emitting elements; and a controller for controlling the plurality of light emitting elements so as to emit corresponding colored rays of light on demand for the respective total light emission times that the plurality of light emitting elements occupy in a light emission drive period, based on the percentage data stored in the storage device.

DESCRIPTION OF THE PREFERRED EMBODIMENTS

First Embodiment

Figure 1:
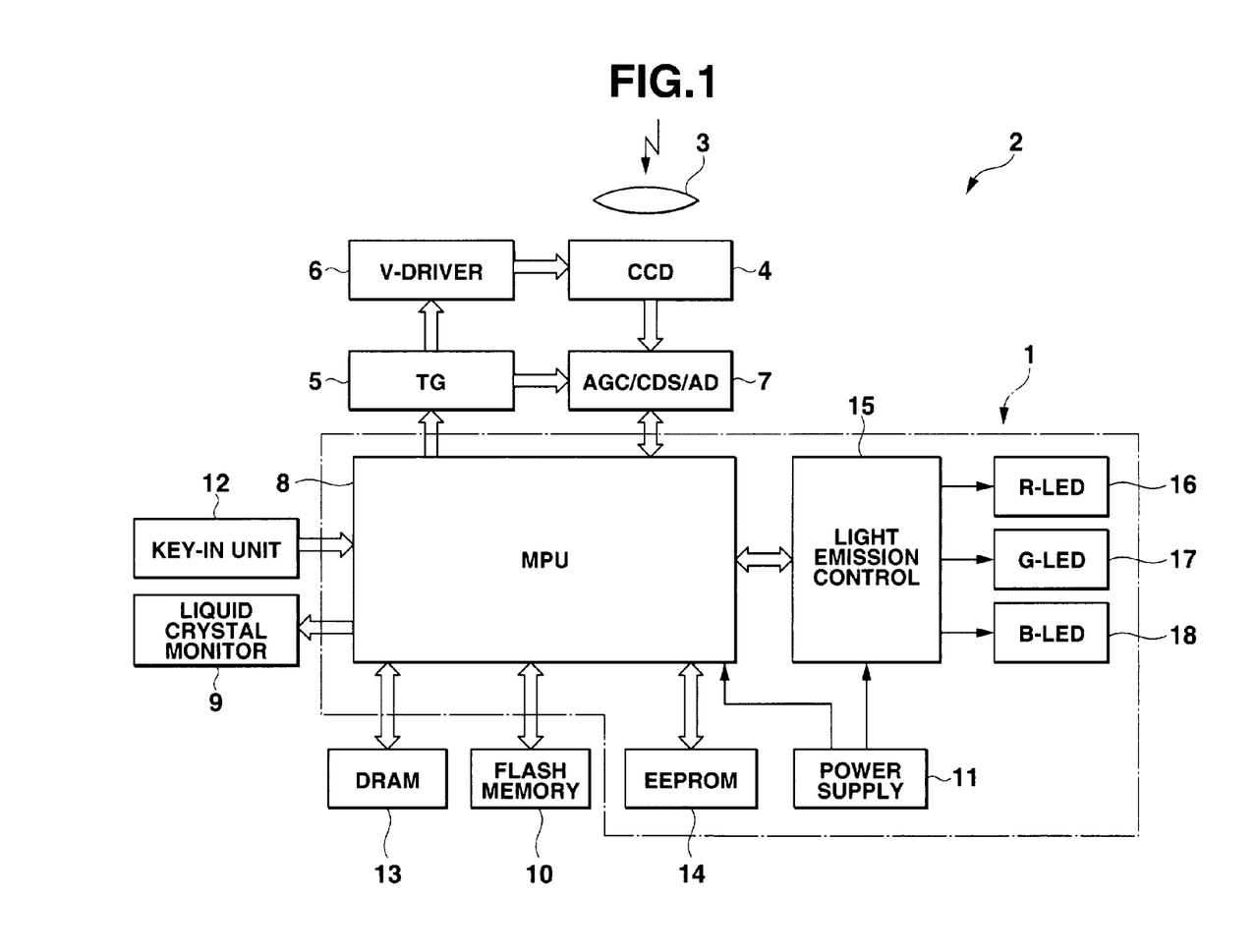
FIG. 1 is a block diagram of a digital camera as each of embodiments of the present invention.

FIG. 1 is a block diagram indicative of an electrical structure of a digital camera 2 having a built-in flash device 1 according to the present invention. The digital camera 2 comprises a CCD 4 that picks up an image of an object focused thereon through an image pickup lens 3, a timing generator 5 and a V-driver 6 for driving the CCD 4 and a composite circuit 7 comprising a CDS (Correlated Double Sampling circuit) that holds an image pickup signal output from the CCD 4, an automatic gain control (AGC) for the image pickup signal, and an A/D converter (AD) that converts the image pickup signal to a digital signal.

The CCD 4 functions as an electronic shutter due to the timing generator 5 and the V-driver 6 changing the charge storage time in response to a shutter pulse from a microprocessor unit (MPU) 8. The MPU 8 has the functions of processing various signals and images. The MPU 8 produces a video signal from a digital image pickup signal outputted by the composite circuit 7, and displays it as an image of the object picked up by the CCD 4 on a liquid crystal monitor 9. In image pickup, the MPU 8 compresses the picked-up image signal to produce an image file of a predetermined format and stores it in a flash memory 10. In reproduction, the MPU 8 expands the compressed image file and displays a resulting image on the monitor 9.

The MPU 8 is connected to a power supply circuit 11 containing a power supply such as a battery, a key-in unit 12 that contains various operation keys and switches such as shutter key, a DRAM 13 as a work memory, an EEPROM 14 in which setting and other data and various programs necessary for data processing and control of various elements of the camera 2 are stored, and a light emission control block 15 to which a plurality of different-colored light emitting diodes; that is, red, green and blue light emitting diodes (R-, G- and B-LEDs) 16, 17 and 18, are connected.

The light emission control block 15 is a drive unit that delivers pulse currents having predetermined values to the light emitting diodes 16, 17 and 18 under control of the MPU 8 in the strobe image pickup mode for light emitting purposes. The setting data stored in the EEPROM 14 contains light emission control data to be used by the light emission control block 15 in the strobe image pickup mode. These light emission control data are proper to the respective light emission diodes 16, 17 and 18 and represents percentages of respective total light-emission-cycle times Rt, Gt and Bt of the red, green and blue light emitting diodes 16, 17 and 18 in an exposure time of the CCD 4, predetermined depending upon their respective desired brightnesses of light emission in the factory such that the strobe light as a mixture of these colored rays of light having such light-emission-cycle times becomes white light.

In the present embodiment, the MPU 8 functions as a controller that controls the light emission control block 15 based on the light emission control data. In this embodiment, the flash device 1 is composed mainly of the power supply circuit 11, MPU 8, EEPROM 14, light emission control block 15, and red, green and blue LEDs 16, 17 and 18.

Figure 2:
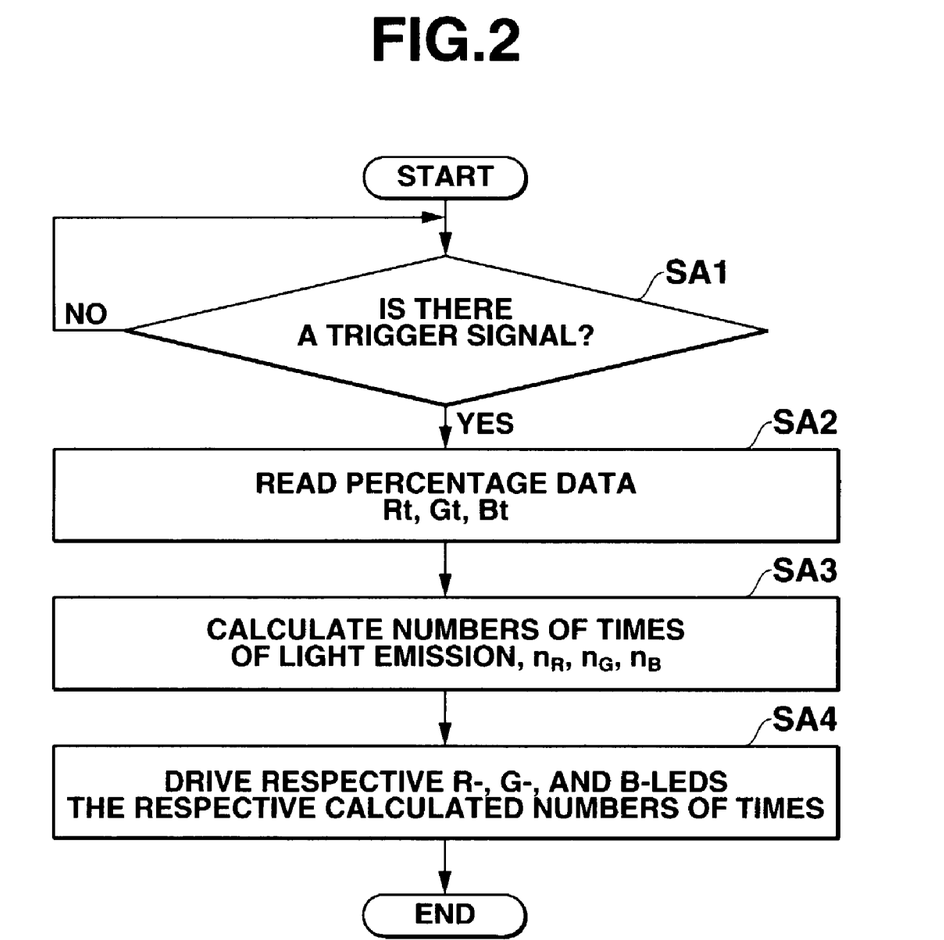
FIG. 2 is a flowchart of a process for controlling a strobe of the camera by its MPU in a first embodiment.
Figure 3:
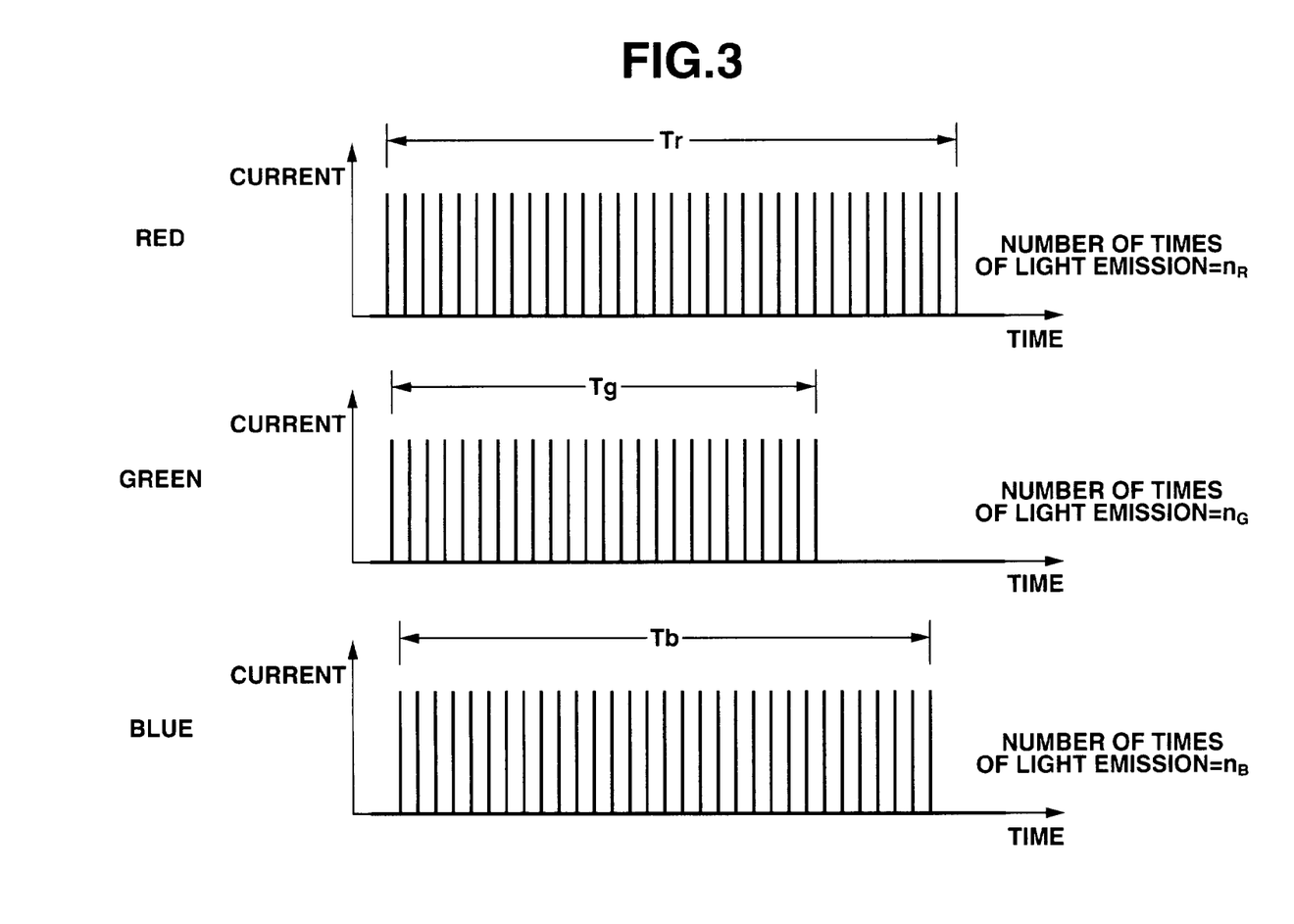
FIG. 3 is a chart indicative of drive timings for three-colored light emitting diodes in the first embodiment.

Control over the flash device 1 provided by the MPU 8 in response to a trigger signal delivered from the key-in unit 12 when the shutter key is depressed will be described with reference to the FIG. 2 flowchart. When a trigger signal is delivered from the key-in unit 12 to the MPU 8 (YES in step SA1), the MPU 8 reads out the percentage data Rt, Gt, Bt from the EEPROM 14 (step SA2), and calculates the respective numbers of times of pulse driving the red, green and blue LEDs 16, 17 and 18 repeatedly (or causing the red, green and blue LEDs repeatedly to emit corresponding colored rays of light), $n_R$, $n_G$, and $n_B$, based on the read percentage data and a required quantity of light to be emitted by the flash device 1 in the exposure time of the CCD 4 in the strobe image-pickup mode (step SA3). More specifically, the respective numbers of times of pulse driving the green and blue LEDs 17 and 18, $n_G$, and $n_B$ are calculated based on the number of times $n_R$ of pulse driving the red LED 16 having a maximum percentage of total light emission time. It is to be noted in this case that the cycles of pulses, each shown by a vertical solid line segment in FIG. 3, driving the LEDs 16, 17 and 18 are the same and that the pulses have the same relevant width. Then, as shown in FIG. 3, the light emission control block 15 drives the LEDs 16, 17 and 18 the respective calculated numbers of times $n_R$, $n_G$, and $n_B$ at substantially different drive timings to thereby provide required white light (step SA4).

As will be obvious from the above, according to this embodiment, the respective percentages representing the total light emission times Tr, Tg and Tb of the red, green and blue LEDs 16, 17 and 18 (actually, each represented by integration of time durations for which the pulse currents flow) in the exposure time T of the CCD 4, which is equal to the total light-emission time Tr that is maximum among the total light emission times Tr, Tg and Tb, are controlled so as to satisfy the percentage data Rt, Gt, Bt stored beforehand in the factory to thereby ensure required white strobe light. In this case, uneven brightnesses of rays of light being emitted by the respective LEDs 16, 17 and 18 can be avoided.

In addition, since the MPU 8 controls the numbers of times of driving the respective LEDs 16–18 with the aid of the light emission control block 15 so as to provide desired white strobe light, no additional driving circuits excluding the conventional light emission control block 15 are required.

Second Embodiment

A second embodiment of the present invention will be described next. This embodiment is the same as the first embodiment excluding that a program for strobe control shown in a flowchart of FIG. 4 and different from that used in the first embodiment is stored in EEPROM 14.

Figure 4:
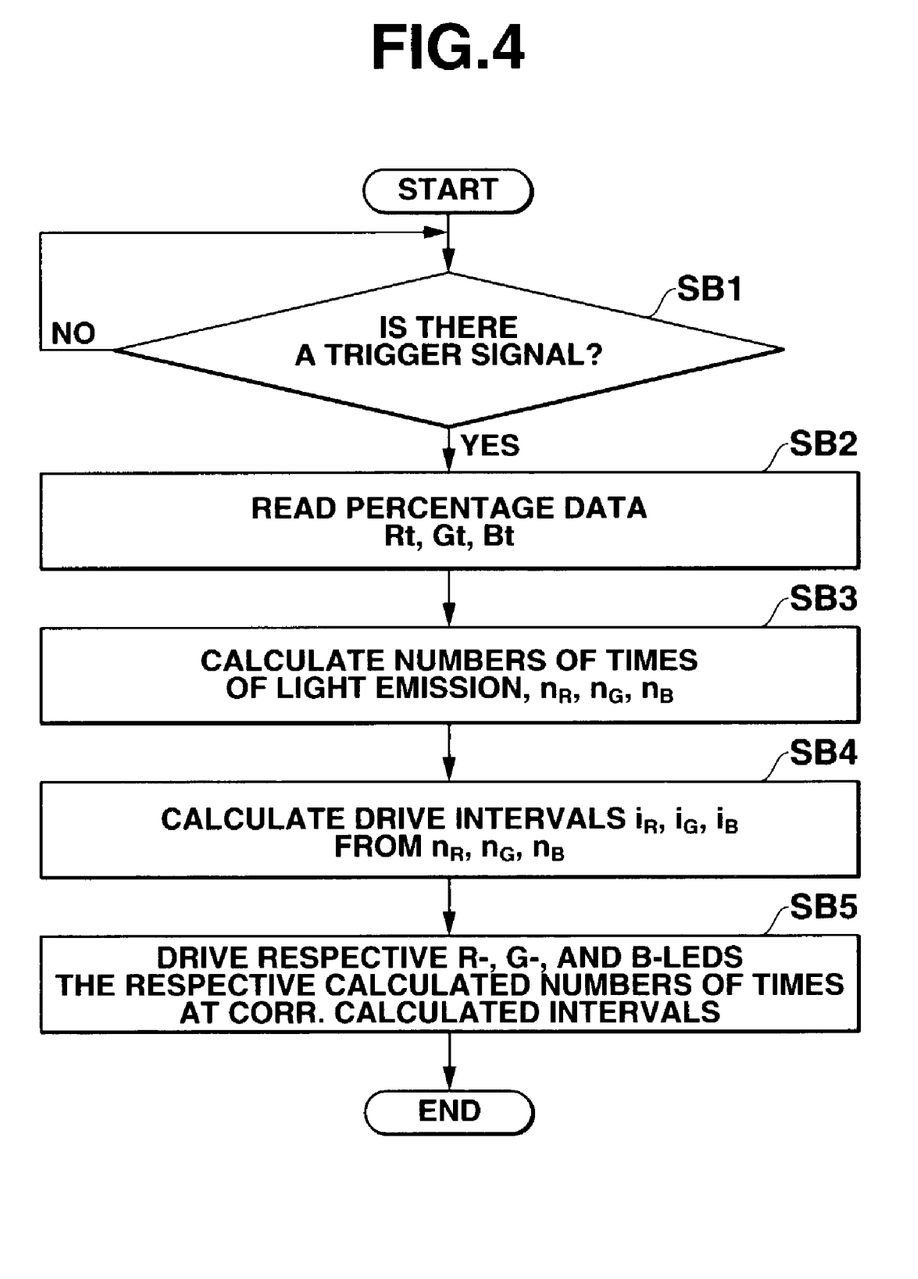
FIG. 4 is a flowchart of a process for controlling the strobe of the camera by its MPU in a second embodiment.
Figure 5:
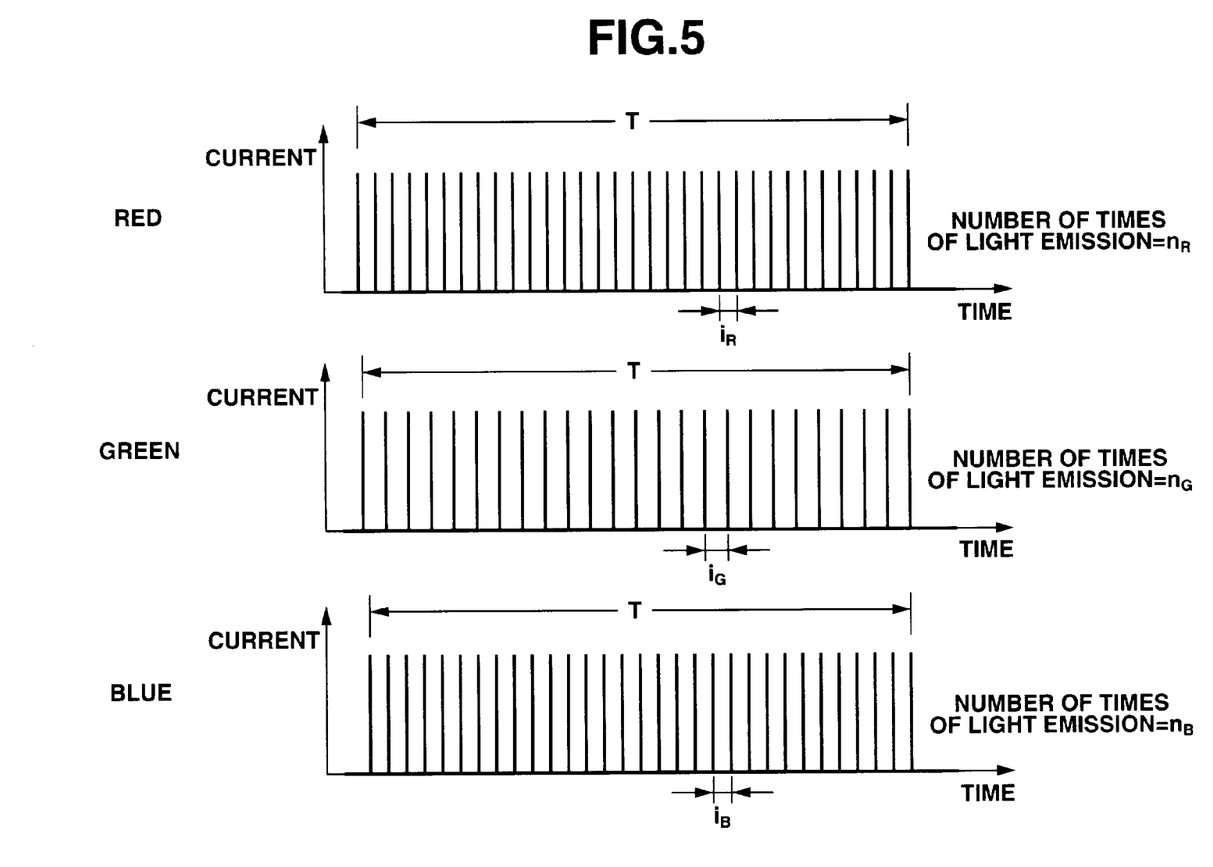
FIG. 5 is a chart indicative of drive timings for the three-colored light emitting diodes in the second embodiment.

Also, in the second embodiment of FIG. 4 the MPU 8 responds to a trigger signal from the key-in unit 12 (YES in step SB1) to read out the percentage data Rt, Gt, Bt from the EEPROM 14 (step SB 2), and calculates the respective numbers of times of light emission of the red, green and blue LEDs 16, 17 and 18 (the numbers of times of pulse driving), $n_R$, $n_G$ and $n_B$, in the exposure time T of the CCD 4 (step SB3). In addition, the MPU 8 calculates pulse drive cycles $i_R$, $i_G$ and $i_B$, in the exposure time T of the CCD 4, corresponding to the calculated numbers of times of light emission $n_R$, $n_G$, and $n_B$, respectively (step SB4). Then, as shown in FIG. 5, the light emission control block 15 periodically pulse drives the respective LEDs 16, 17 and 18 the calculated numbers of times of light emission $n_R$, $n_G$, and $n_B$ at the pulse drive cycles $i_R$, $i_G$ and $i_B$ in the exposure time T (step SB5). At this time, it is to be noted that the respective red, green and blue LED drive pulses each shown by a vertical black solid line segment have the same relevant width. As shown in FIG. 5, at least one of the LEDs 16, 17 and 18 is different in pulse drive cycle from the other. For example, as shown in FIG. 5, the pulse drive cycles $i_R$ and $i_G$ are different from each other.

As will be obvious from the above, as in the first embodiment the respective percentages representing the total light emission times of the red, green and blue LEDs 16, 17 and 18 (actually, each represented by integration of time durations for which the pulse currents flow) in the exposure time of the CCD 4 are controlled so as to satisfy the percentage data Rt, Gt, Bt stored beforehand in the factory to thereby ensure required white strobe light.

In addition, the light emission durations of the respective LEDs 16–18 are dispersed at equal intervals within the exposure time T to thereby provide uniform white light for the strobe in the light emission time (exposure time) of the flash device 1. Thus, an image of an object exhibiting very rapidly changing movements can be picked up satisfactorily in the uniform white light from the strobe.

Third Embodiment

A third embodiment of the present invention will be described next. This embodiment is the same as the above-mentioned embodiments excluding that a program for strobe control shown in FIG. 6 is stored in EEPROM 14.

Figure 6:
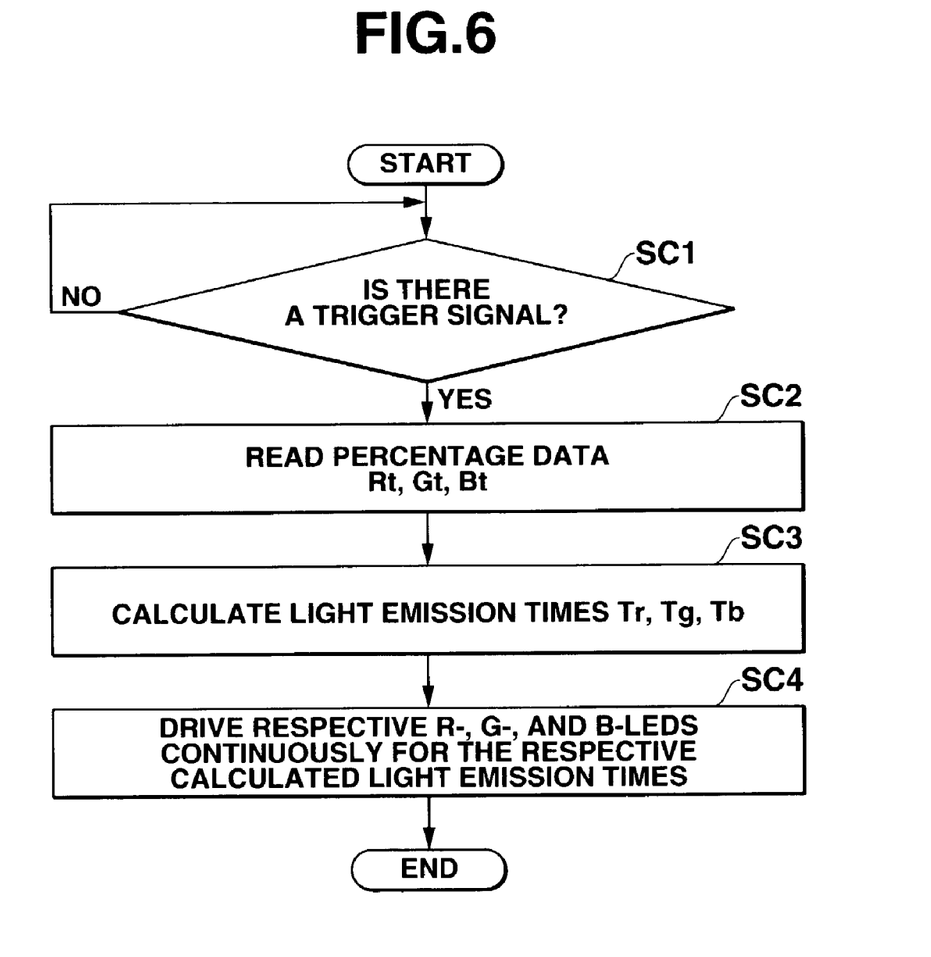
FIG. 6 is a flowchart of a process for controlling the strobe of the camera by its MPU in a third embodiment.
Figure 7:
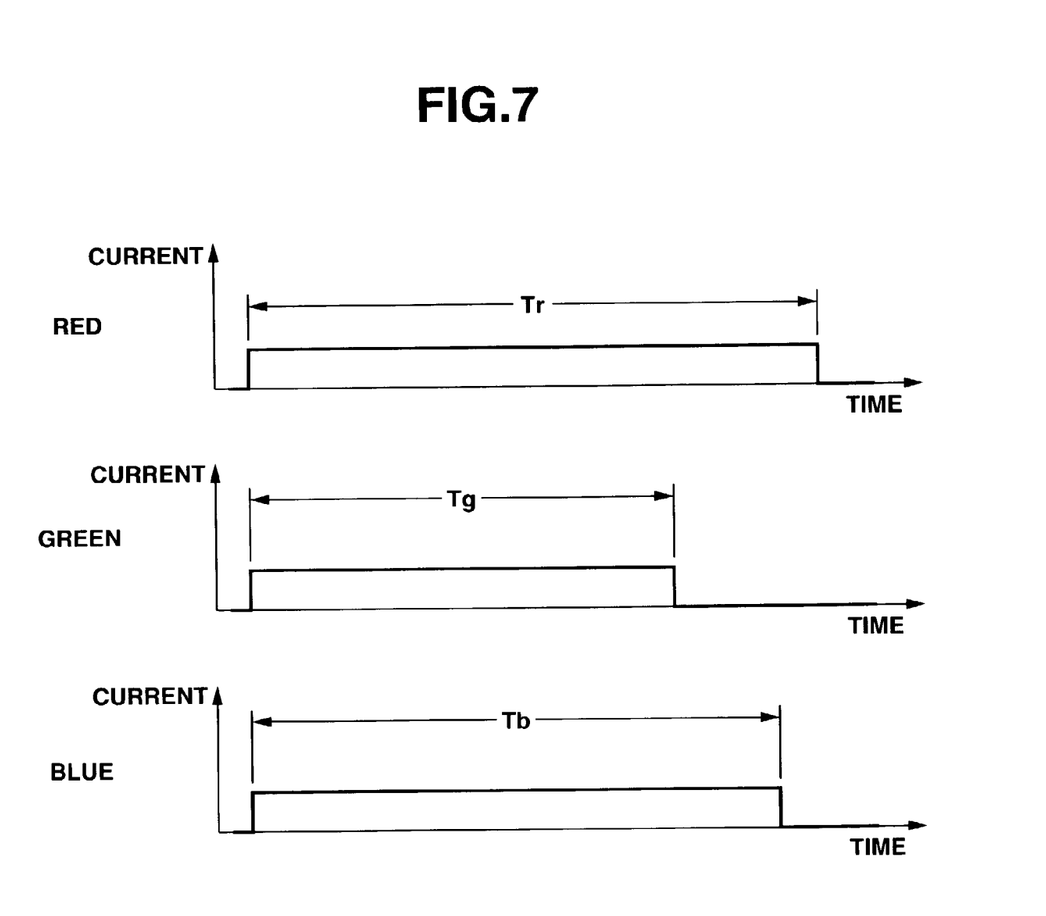
FIG. 7 is a chart indicative of drive timings for the three-colored light emitting diodes in the third embodiment.

Also, in this embodiment of FIG. 6 when a trigger signal is delivered from the key-in unit 12 to the MPU 8 (YES in step SC1), the MPU 8 reads out the percentage data Rt, Gt, Bt from the EEPROM 14 (step SC 2), and calculates the respective drive times (light emission times) Tr, Tg and Tb of the red, green and blue LEDs 16, 17 and 18 in the exposure time of the CCD 4 (step SC3). More specifically, the respective drive times Tg and Tb of the green and blue LEDs 17 and 18 are calculated based on the drive time Tr of the red LED that is maximum among the drive times Tr, Tg and Tb and equal to the exposure time of the CCD 4. Then, as shown in FIG. 7, the light emission control block 15 continuously drives the LEDs 16, 17 and 18 for the drive times Tr, Tg and Th, respectively (step SC4).

In conclusion, as in the first and second embodiments the respective percentages representing the light emission times Tr, Tg and Tb of the red, green and blue LEDs 16, 17 and 18 in the exposure time T of the CCD are controlled so as to satisfy the percentage data Rt, Gt and Bt stored beforehand in the factory to thereby ensure providing required white strobe light.

Fourth Embodiment

A fourth embodiment of the present invention will be described next. This embodiment is the same as the above-mentioned embodiments excluding that a program for strobe control shown in FIG. 8 is stored in EEPROM 14.

Figure 8:
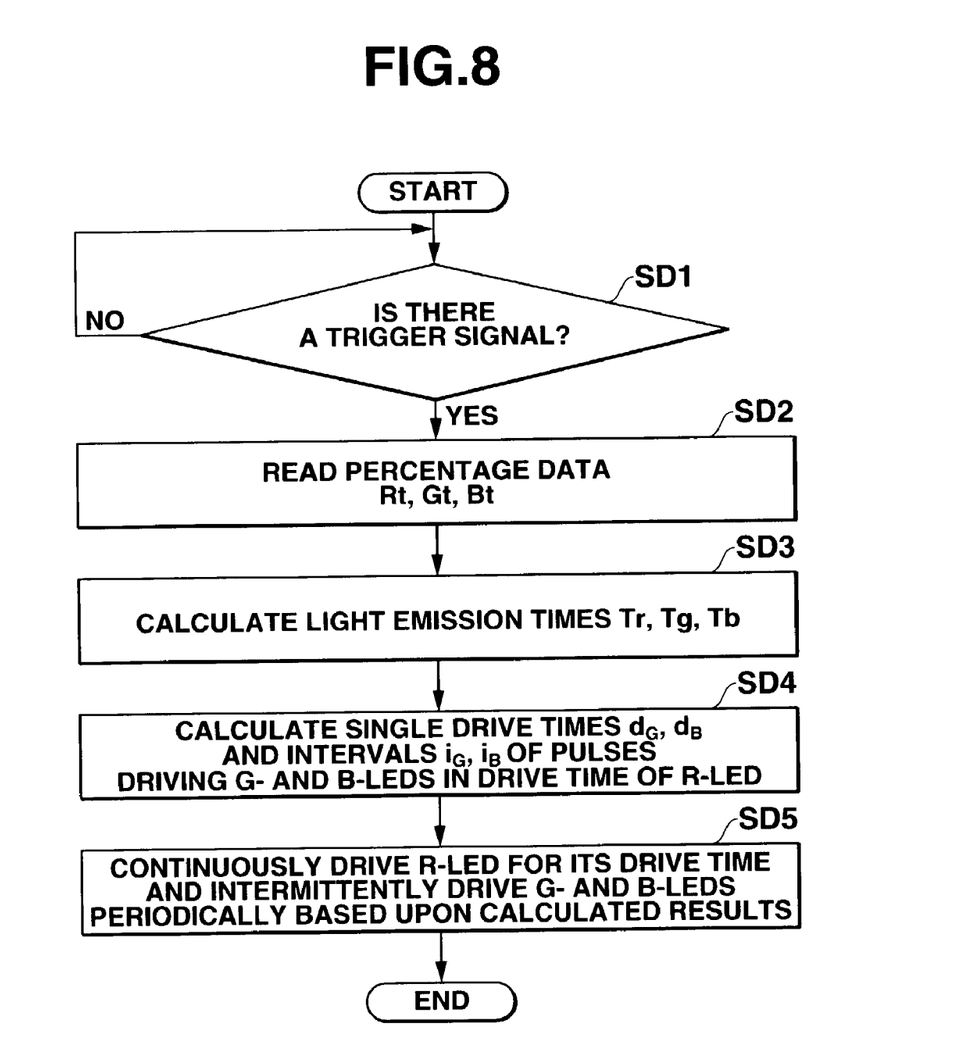
FIG. 8 is a flowchart of a process for controlling the strobe of the camera by its MPU in a fourth embodiment.
Figure 9:
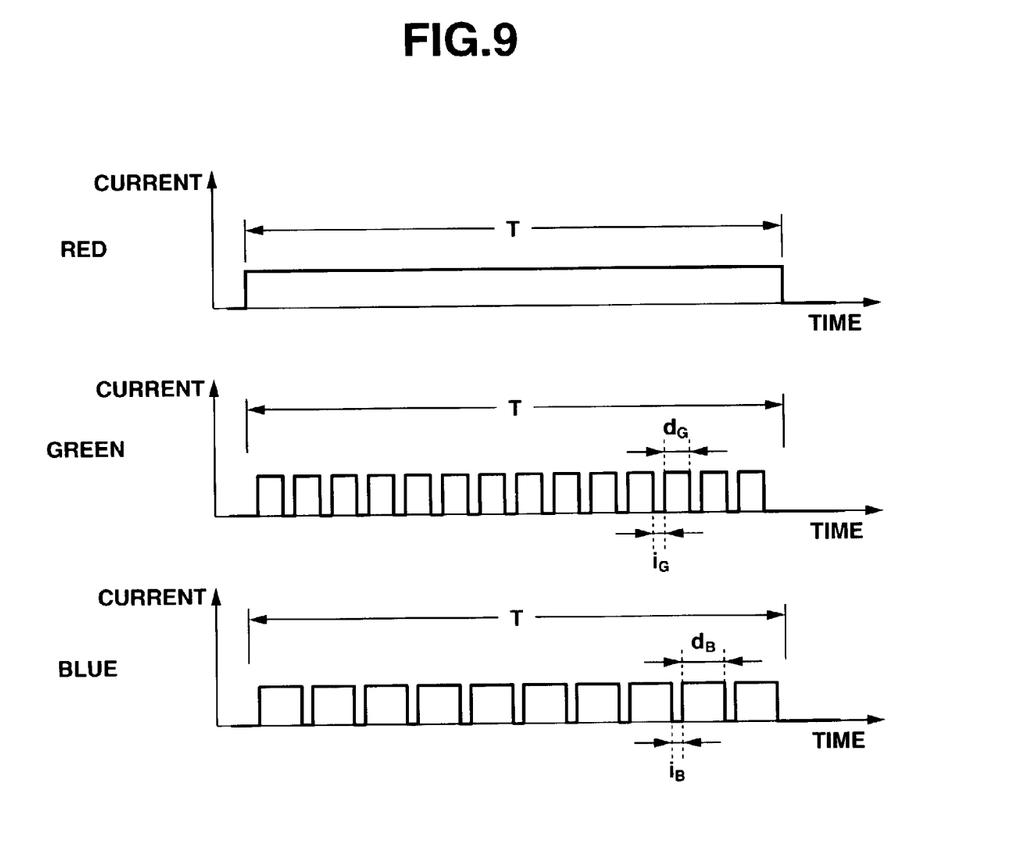
FIG. 9 is a chart indicative of drive timings for the three different-colored light emitting diodes in the fourth embodiment.

Also, in this embodiment of FIG. 8 when a trigger signal is delivered from the key-in unit 12 to the MPU 8 (YES in step SD1), the MPU 8 reads out the percentage data Rt, Gt, Bt from the EEPROM 14 (step SD 2), and calculates the respective drive times (or light emission times) Tr, Tg and Tb of the red, green and blue LEDs 16, 17 and 18 in the exposure time T of the CCD 4 (step SD3). More specifically, the respective drive times Tg and Tb of the green and blue LEDs 17 and 18 are calculated based on the drive time Tr of the red LED that is maximum among the drive times of the LEDs 16–18 and equal to the exposure time T of the CCD 4. In addition, the MPU 8 calculates the drive time durations $d_G$, $d_B$ and drive intervals $i_G$ and $i_B$ of pulses driving the green and blue LEDs 17 and 18, respectively, in the drive or exposure time Tr of the red LED 16 (step SD4). Then, as shown in FIG. 9, the light emission control block 15 continuously drives the red LED 16 in the exposure time T of the CCD 4, and intermittently pulse drives the green and blue LEDs 17 and 18 for the drive time durations $d_G$ and $d_B$ at the drive intervals $i_G$ and $i_B$, respectively (step SD5).

Briefly, as in the above embodiments the respective percentages representing the total light emission times of the red, green and blue LEDs 16, 17 and 18 (actually, each represented by integration of time durations for which the pulse currents flow) in the exposure time T of the CCD 4 are controlled so as to satisfy the percentage data Rt, Gt and Bt stored beforehand in the factory to thereby ensure required white strobe light.

In addition, the LEDs 17 and 18 are each pulse driven at corresponding equal intervals in the exposure time T of the CCD 4 and the light emission durations of the respective LEDs 16–18 are dispersed at equal intervals within the exposure time T to thereby provide uniform white strobe light in the light emission time (exposure time) of the flash device 1. Thus, an image of an object exhibiting very rapidly changing movements can be picked up satisfactorily in the strobe image pickup, as in the second embodiment.

While in the respective embodiments each flash device 1 has been described as having three primary-colored (red, green and blue) LEDs 16, 17 and 18 to thereby provide white strobe light, the present invention is not limited to these particular cases. For example, only two different-colored LEDs or more than three primary-colored LEDs may be used in order to provide desired colored light. Alternatively, a plurality of LEDs may be used together to emit any one of red, green and blue rays of light. In any of the above-mentioned cases, the layout of the LEDs is not especially limited. They may be disposed in a straight line or along the periphery of a circle. When colored strobe light other than white light is desired, the corresponding two LEDs whose light emissions will be mixed to form the colored strobe light may be used or selected from among LEDs that emit various colored rays of light, respectively.

While in the above embodiments the flash devices 1 built in the digital cameras 2 have been described as the present invention, the flash device 1 may be composed as a separate one by itself and can be used with the conventional cameras and other digital cameras to provide advantageous effects similar to those produced by the above embodiments.

What is claimed is:
1. A flash device comprising:
   a plurality of light emitting elements each for emitting a ray of light having a different color;
   a memory storing data on a plurality of percentages determined respectively for the plurality of light emitting elements;
   a driver for driving the plurality of light emitting elements with respective series of drive pulses to emit the corresponding different colored rays of light a number of times corresponding to the drive pulses;
   a controller for controlling the driver to drive the plurality of light emitting elements with the corresponding series of drive pulses such that, for each of the plurality of light emitting elements a percentage of a total light emission timer of a predetermined light emission drive period, during which the light emitting element emits the rays of light conforms to the one of the plurality of percentages stored in the memory that corresponds to the light emitting element;
   wherein, for each of the plurality of light emitting elements except one of the light emitting elements corresponding to a highest percentage stored in the memory, the controller sets at equal intervals of time moments when the light emitting element starts to be driven to emit each ray of light by the corresponding individual drive pulses during a drive duration of the light emitting element.

2. The flash device of claim 1, wherein at least one of the plurality of light emitting elements is caused by the controller to emit the rays of light a different number of times than any other of the light emitting elements.

3. The flash device of claim 1, wherein the controller causes the moments when at least one of the light emitting element starts to be driven to emit each ray of light by the corresponding individual drive pulses to be different from the moments when any other of the light emitting elements starts to be driven to emit each ray of light by the corresponding individual drive pulses.

4. A flash device comprising:
   a plurality of light emitting elements each for emitting a ray of light having a different color;
   a memory storing data on a plurality of percentages determined respectively for the plurality of light emitting elements;
   a driver for driving the plurality of light emitting elements to emit the corresponding different colored rays of light;
   a controller for controlling the driver to drive the plurality of light emitting elements such that, for each of the plurality of light emitting elements a percentage off a total light emission time, of a predetermined light emission drive period, during which the light emitting element emits the light conforms to the one of the plurality of percentages stored in the memory that corresponds to the light emitting element;
   wherein the controller controls the driver to continuously drive, during the light emission drive period, one of the light emitting elements corresponding to a highest percentage stored in the memory, and to intermittently drive each other one of the light emitting elements so as to emit the corresponding rays of light in a time-divisional manner during the light emission drive period.

5. The flash device of claim 4, wherein the one of the light emitting elements corresponding to the highest percentage stored in the memory emits red rays of light.

6. The flash device of claim 4, wherein the controller calculates a drive time duration and a drive interval oft time of each of the light emitting elements, except for the one of the light emitting elements corresponding to the highest percentage stored in the memory, based on the drive time of the one of the light emitting elements corresponding to the highest percentage stored in the memory.

7. A method of controlling a flash device, comprising:
determining, beforehand, data on a plurality of percentages determined respectively for a plurality of light emitting elements;
driving the plurality of light emitting elements with respective series of drive pulses such that, for each of the plurality of light emitting elements a percentage of a total light emission time, of a predetermined light emission drive period, during which the light emitting element emits the rays of light conforms to the one of the plurality of percentages that corresponds to the light emitting element; and
setting, for each of the plurality of light emitting elements except one of the light emitting elements corresponding to a highest percentage stored in the memory, the controller sets at equal intervals of time moments when the light emitting element starts to be driven to emit each ray of light by the corresponding individual drive pulses during a drive duration of the light emitting element.

8. A method of controlling a flash device, comprising:
determining, beforehand, data on a plurality of percentages determined respectively for a plurality of light emitting elements; and
driving the plurality of light emitting elements to emit the corresponding different colored rays of light such that, for each of the plurality of light emitting elements a percentage of a total light emission time, of a predetermined light emission drive period, during which the light emitting element emits the light conforms to the one of the plurality of percentages stored in the memory that corresponds to the light emitting element; and
wherein during the light emission drive period, one of the light emitting elements corresponding to a highest one of the percentages is continuously driven, and each other one of the light emitting elements is intermittently driven so as to emit the corresponding rays of light in a time-divisional manner during the light emission drive period.

9. The method of claim 8, wherein the one of the light emitting elements corresponding to the highest percentage emits red rays of light.

10. The method of claim 8, wherein a drive time duration and a drive interval of time of each of the light emitting elements, except for the one of the light emitting elements corresponding to the highest percentage, is calculated based on a drive time of the one of the light emitting elements corresponding to the highest percentage.

11. A computer-readable medium having a computer program for controlling a flash device recorded thereon, the program being executable by a computer to cause the computer to perform:
determining, beforehand, data on a plurality of percentages determined respectively for a plurality of light emitting elements;
driving the plurality of light emitting elements with respective series of drive pulses such that, for each of the plurality of light emitting elements a percentage of a total light emission time, of a predetermined light emission drive period, during which the light emitting element emits the rays of light conforms to the one of the plurality of percentages that corresponds to the light emitting element; and
setting, for each of the plurality of light emitting elements except one of the light emitting elements corresponding to a highest percentage stored in the memory, the controller sets at equal intervals of time moments when the light emitting element starts to be driven to emit each ray of light by the corresponding individual drive pulses during a drive duration of the light emitting element.

12. A computer-readable medium having a computer program for controlling a flash device recorded thereon, the program being executable by a computer to cause the computer to perform:
determining, beforehand, data on a plurality of percentages determined respectively for a plurality of light emitting elements; and
driving the plurality of light emitting elements to emit the corresponding different colored rays of light such that, for each of the plurality of light emitting elements a percentage of a total light emission time, of a predetermined light emission drive period, during which the light emitting element emits the light conforms to the one of the plurality of percentages stored in the memory that corresponds to the light emitting element; and
wherein during the light emission drive period, one of the light emitting elements corresponding to a highest one of the percentages is continuously driven, and each other one of the light emitting elements is intermittently driven so as to emit the corresponding rays of light in a time-divisional manner during the light emission drive period.

13. The computer-readable medium of claim 12, wherein the one of the light emitting elements corresponding to the highest percentage emits red rays of light.

14. The computer-readable medium of claim 12, wherein a drive time duration and a drive interval of time of each of the light emitting elements, except for the one of the light emitting elements corresponding to the highest percentage, is calculated based on a drive time of the one of the light emitting elements corresponding to the highest percentage.

* * * * *